A. JENNINGS.
Shovel Plow.
No. 81,173.
Patented Aug. 18, 1868
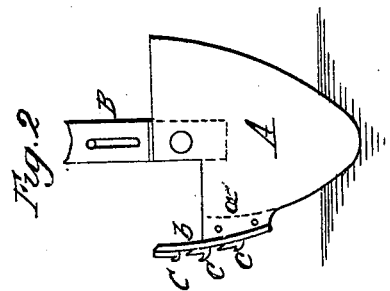
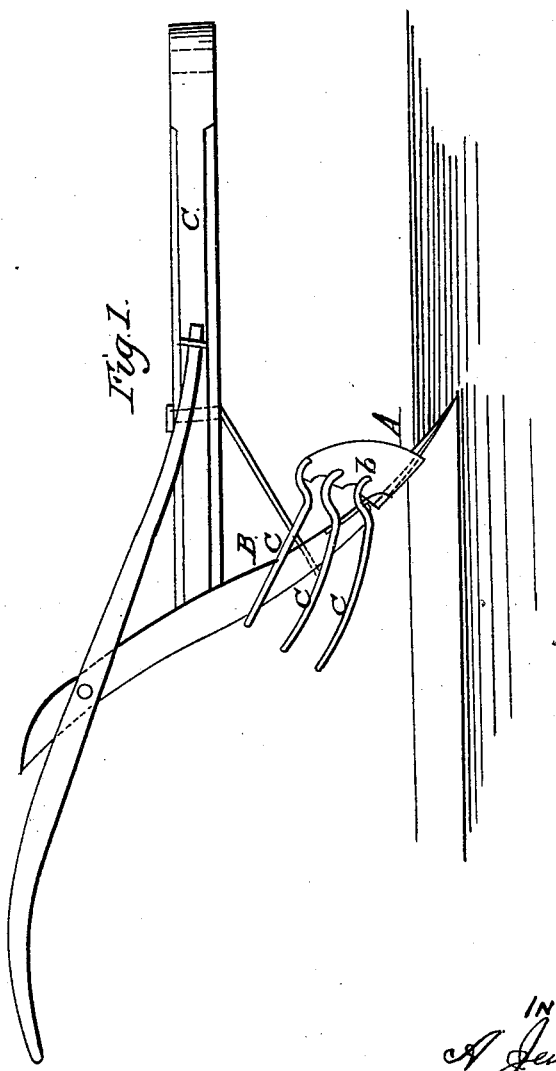

UNITED STATES PATENT OFFICE.

AARON JENNINGS, OF WEST CAIRO, OHIO.

IMPROVEMENT IN SHOVEL-PLOWS.

Specification forming part of Letters Patent No. 81,173, dated August 18, 1868.

*To all whom it may concern:*

Be it known that I, AARON JENNINGS, of West Cairo, in the county of Allen and State of Ohio, have invented a new and Improved Shovel-Plow; and I do hereby declare that the following is a full, clear, and exact description thereof, which will enable others skilled in the art to make and use the same, reference being had to the accompanying drawings, forming part of this specification.

Figure 1 represents a side elevation of my improved shovel-plow. Fig. 2 is a front elevation of the same.

Similar letters of reference indicate corresponding parts.

This invention relates to a new shovel-plow, which is so arranged and constructed that it will uproot and cover weeds or grass close to the plants, and that it will prevent clods from falling upon young plants, such as rice or corn plants.

The invention consists in forming a horizontal projection on that side of the shovel which is nearest the row of plants, which projection uproots all the weeds and grass close to the plants; it does not cut them, as I prefer to have its edge blunt.

The invention also consists in the use of an upright guard, with guard-fingers, which are also on the same side of the plow, and which keep all clods from falling upon the young plants.

A in the drawing represents the shovel which is of suitable size and form, and which is secured to a standard, B, that projects from the plow-beam C.

I prefer to have the front edge of the plow rounded. On that side of the shovel or plow which is nearest the row of plants is formed, on the same plane with the shovel, a projecting portion, *a*, the front edge of which is receding from the front edge of the plow, and which serves to dig out and uproot all plants that may be in its way.

From the same side of the plow projects a guard-plate, *b*, on which a series of guard-fingers, *c c*, are formed, as is clearly shown in Fig. 1.

As this instrument is drawn along, the weeds and grass, uprooted by the projection *b*, fall over the shovel, and the clods are thrown upon them. The guard and fingers prevent the clods from falling upon the young plants close to which the plow may be moved.

I claim as new and desire to secure by Letters Patent—

The plow provided with the side projection *a*, and with the upright guard *b*, on which the fingers *c* are secured, substantially as herein shown and described.

AARON JENNINGS.

Witnesses:
L. C. CRIBBS,
JOHN JENNINGS.